United States Patent [19]
Rice

[11] 3,884,138
[45] May 20, 1975

[54] TWINE CUTTING APPARATUS FOR A HAY BALER

[76] Inventor: Jerry M. Rice, Route 2, Hedrick, Iowa 52563

[22] Filed: Apr. 3, 1974

[21] Appl. No.: 457,568

[52] U.S. Cl. .................................................. 100/5
[51] Int. Cl. ............................................ B65b 63/04
[58] Field of Search .......... 100/5; 56/341, 342, 343; 83/597, 928

[56] References Cited
UNITED STATES PATENTS

| | | | |
|---|---|---|---|
| 799,175 | 9/1905 | Luebben et al. | 100/5 |
| 2,781,092 | 2/1957 | Madsen | 83/597 |
| 2,926,599 | 3/1960 | McClellan | 56/343 |

Primary Examiner—Richard E. Aegerter
Assistant Examiner—L. Footland
Attorney, Agent, or Firm—Zarley, McKee, Thomte & Voorhees

[57] ABSTRACT

A twine cutting apparatus for a hay baler comprising a spring loaded blade support pivotally connected to a second support which is secured to the baler frame. The spring loaded blade support is connected to the baler tail gate by a cable. A blade means is secured to the blade support and is automatically pivotally movewd towards a second blade means on the second support for cutting the twine as the tail gate is raised to eject the bale therefrom. The spring loaded blade support is returned to its non-cutting position by the spring connected thereto as the tail gate is closed.

6 Claims, 4 Drawing Figures

TWINE CUTTING APPARATUS FOR A HAY BALER

BACKGROUND OF THE INVENTION

This invention relates to a twine cutting apparatus for a hay baler and more particularly to a twine cutting apparatus for a hay baler which automatically cuts the twine as the tail gate of the baler opens to eject the bale therefrom.

In hay baling machines such as that manufactured by Vermeer Manufacturing Company, Pella, Iowa, the hay passes through compression rollers and is folded onto itself by a plurality of belts so that very large cylindrical bales are formed. When the bale is complete, it is necessary for the operator to cause twine to be rolled around the rotating bale and then pull a cable or rope which causes the twine to be cut. The operator then pivotally opens the tail gate of the baler so that the bale may be ejected therefrom. The fact that the twine cutter must be manually actuated results in considerable time being wasted and is an inconvenient step.

Therefore, it is a principal object of the invention to provide an improved twine cutting apparatus for a hay baler.

A further object of the invention is to provide a twine cutting apparatus for an extremely large hay baler which automatically cuts the twine as the tail gate is opened to eject the bale therefrom.

A further object of the invention is to provide a twine cutting apparatus for a hay baler which eliminates the need for the operator to manually actuate the same.

A further object of the invention is to provide a twine cutting apparatus for a hay baler which may be either original equipment or which may be supplied as a kit for installation on a hay baler.

A further object of the invention is to provide a twine cutting apparatus for a hay baler which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 1:
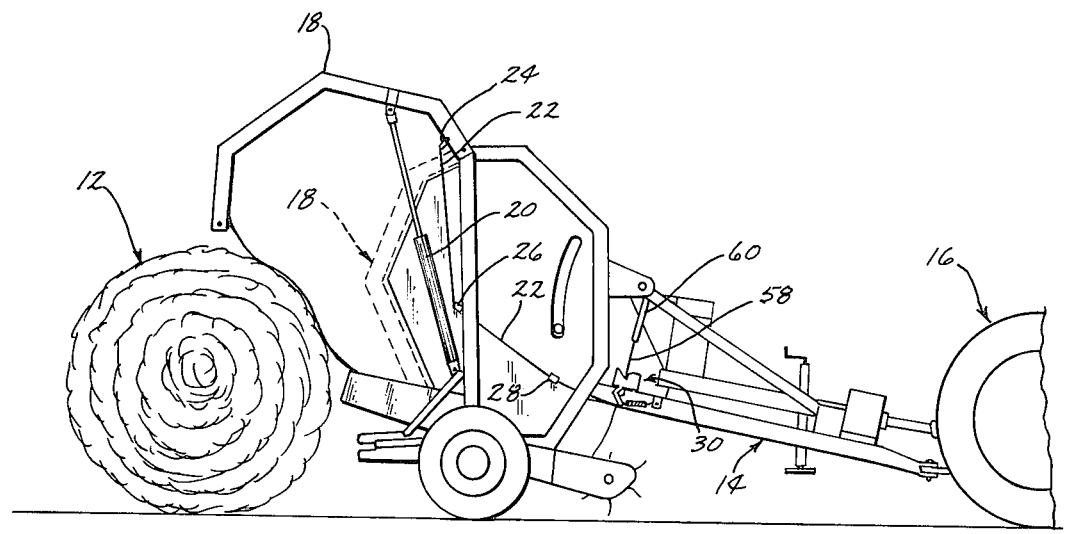
FIG. 1 is a side view of the hay baler having the apparatus of this invention mounted thereon.

In the drawings, the numeral 10 refers generally to a hay baler capable of producing extremely large cylindrical bales 12. Vermeer Manufacturing Company of Pella, Iowa manufactures such a baler and is designated as Model 605B. Baler 10 generally comprises a wheel frame means 14 which is drawn by a prime mover such as a tractor 16 or the like. The numeral 18 refers generally to a tail gate which is normally in the position illustrated by dotted lines in FIG. 1 during the formation of the bale. The tail gate 18 may be pivotally moved to the open position illustrated by solid lines in FIG. 1 by the hydraulic cylinder means 20 when the bale has been formed and it is desired to eject the same from the rear of the baler.

The numeral 22 refers to a cable which is secured to the tail gate 18 at 24 and which extends forwardly therefrom through eyelets 26 and 28. The numeral 30 refers generally to twine cutting apparatus of this invention which is actuated by the cable 22 upon the tail gate 18 being moved to the position illustrated by solid lines in FIG. 1. Support 32 is secured to frame member 34 by a bolt means 36 and extends upwardly therefrom to terminate in an inclined portion 38. Blade 40 is rigidly secured to the upper end of the support 32 by means of bolts 42 and 44. Blade 46 is pivotally connected to bolt 44 as seen in the drawings and is adapted to pivotally move towards and away from the blade 40 to cooperate therewith.

Figure 3:
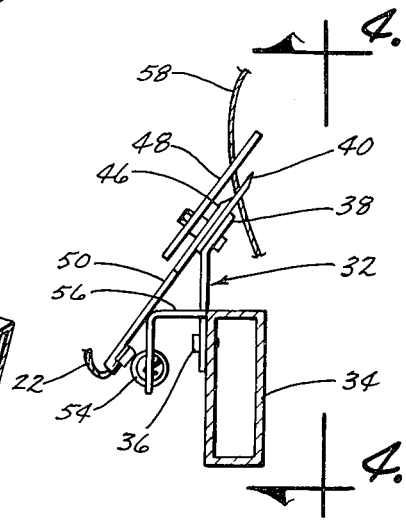
FIG. 3 is a sectional view seen on lines 3—3 of FIG. 2.

Plate 48 is positioned above the blades and is secured to the support 32 by the bolts 42 and 44. As seen in FIG. 3, plate 48 is spaced from the blades 40 and 46. Arm 50 is secured to the lower rearward end of blade 46 by welding or the like and extends downwardly therefrom. Cable 22 is secured at its forward end to the lower end of the arm 50 by a suitable clamp means 52. Spring 54 is connected at its rearward end to the clamp means 52 and is connected at its forward end to the bracket 56 which extends outwardly from the frame member 34. The numeral 58 refers to the twine used for tying the bale and which normally extends outwardly from a twine tube generally referred to by the reference numeral 60.

Figure 2:
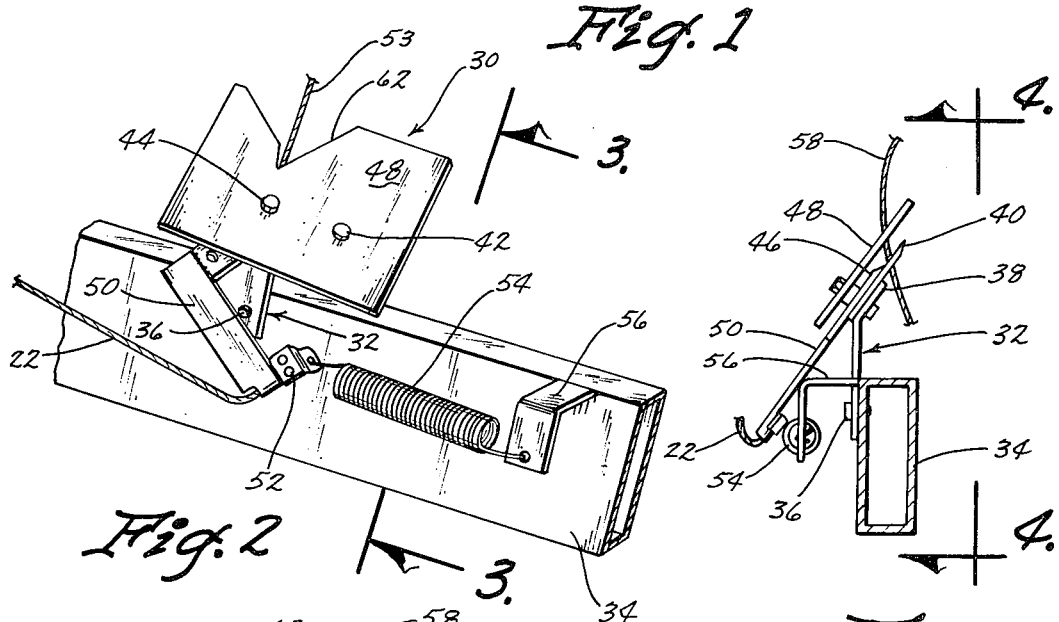
FIG. 2 is a perspective view of the apparatus of this invention.
Figure 4:
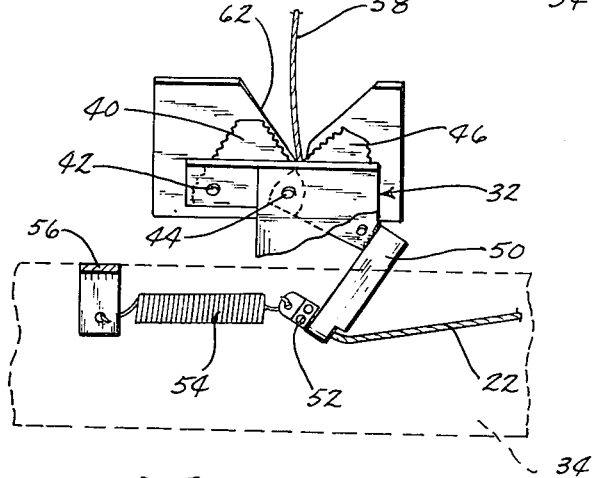
FIG. 4 is a view of the apparatus as seen on lines 4—4 of FIG. 3.

The apparatus 30 is normally in the position illustrated in FIG. 2 and the twine passes through the generally V-shaped notch 62 formed in plate 48. The tail gate 18 is normally in the position illustrated by dotted lines in FIG. 1 during the formation of the bale. When the bale has been formed, the operator activates the hydraulic cylinder means 20 so that the tail gate 18 is pivotally moved upwardly to the position illustrated by solid lines in FIG. 1. As the tail gate 18 pivotally moves upwardly to permit the bale 12 to be ejected therefrom, cable 22 causes blade 46 to pivot about bolt 44 so that the blades 46 and 40 cooperate to cut the twine 58. After the bale 12 has been ejected from the baler and the twine cut, the operator activates the hydraulic cylinder means 20 to close the tail gate 18. Spring means 54 causes the blade 46 to be pivotally moved to the position illustrated in FIG. 4 as cable 22 becomes slack as the tail gate 18 closes. The apparatus is then in position for the next twine cutting operation.

Thus it can be seen that a novel twine cutting apparatus has been provided for a hay baler which automatically cuts the twine as the tail gate is opened to permit the bale to be dumped therefrom. It is not necessary for the operator to manually actuate the twine cutting apparatus since it automatically operates. The apparatus is ideally suited as original equipment but also may be installed on existing equipment as a kit. Thus it can be seen that the apparatus of this invention accomplishes at least all of its stated objectives.

I claim:

1. In combination with a baler having a twine tying means and a movable tail gate which is adapted to open to eject the bale therefrom, comprising, a support means secured to the baler, a blade means operatively pivotally secured to said support means for cutting the twine, and means connecting the baler tail gate and said blade means so that said blade means automatically cuts the twine as the tail gate moves to its open position.

2. The combination of claim 1 wherein said connecting means comprises a cable means.

3. The combination of claim 1 wherein said blade means is movable between cutting and non-cutting positions relative to the twine, and a spring means connected to said blade means for moving said blade means from its cutting position to its non-cutting position.

4. The combination of claim 1 wherein a second blade means is secured to said support means, said blade means being pivotally moved towards said second blade means to cooperate therewith when the tail gate is moved to its open position.

5. The combination of claim 4 wherein an arm means is secured to said blade means and extends therefrom, said connecting means being secured to said arm means.

6. The combination of claim 5 wherein a spring means is operatively connected to said arm means for moving said blade means to a non-cutting position when the tail gate is moved to its closed position.

* * * * *